Patented July 11, 1933

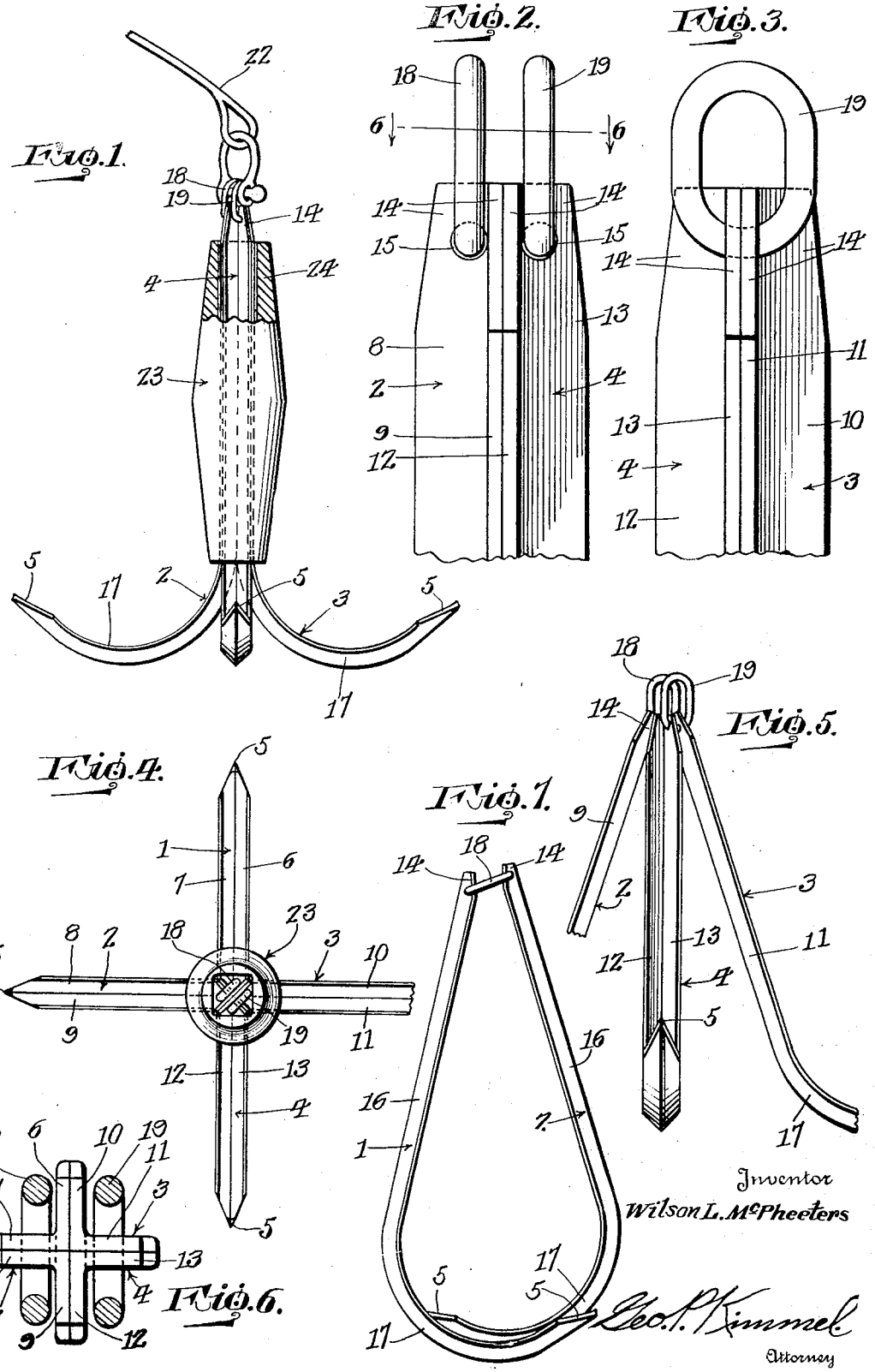

1,918,119

UNITED STATES PATENT OFFICE

WILSON L. McPHEETERS, OF NORTH HOLLYWOOD, CALIFORNIA

ANCHOR

Application filed July 30, 1932. Serial No. 626,929.

My invention relates to an anchor.

The essential objects of my invention are to provide, in a manner as hereinafter set forth, an anchor including fluke elements loosely connected together in pairs and with the elements of each pair capable of being folded and extended with respect to each other when desired; a combined fluke holding and weighting member common to the pairs of fluke elements for removably mounting on the latter to maintain the fluke elements in extended position relatively to each other and in anchoring position; independent fluke elements capable of being folded compactly when not desired for use; detachable means for connecting the pairs of fluke elements together; separate parts capable of being readily assembled to provide a structure having a series of anchoring points; a series of fluke elements capable of being releasably maintained in an anchoring position at right angles to each other; fluke elements of V-shaped cross section for increasing the strength and facilitating the passage thereof to anchoring position; fluke elements capable of abutting for a portion of their length when in anchoring position; a holding and weighting element for a series of fluke elements and with the former functioning to maintain the fluke elements in abutting engagement when in anchoring position; and to attain these ends by a comparatively simple, strong, durable, thoroughly efficient, knockdown, comparatively inexpensive anchor structure capable of being readily assembled for use when occasion required.

To the above ends essentially, and to others which may hereinafter appear, my invention consists of such parts, and such combination of parts which fall within the scope of the invention as claimed.

In the drawing:

Figure 1 is an elevation, partly in section of the anchor when extended.

Figure 2 is a fragmentary view in elevation of a pair of fluke elements.

Figure 3 is a view similar to Figure 2 illustrating a pair of fluke elements coupled together.

Figure 4 is a top plan view, broken away, of the anchor when extended.

Figure 5 is an elevation, broken away, of the fluke elements in disassembled relation with respect to each other.

Figure 6 is a section on line 6—6 Figure 2.

Figure 7 is a perspective view of a pair of coupled fluke elements illustrating the latter folded when the anchor is disassembled.

The anchor includes two pairs of fluke elements. The elements of one pair are designated generally at 1, 2 and those of the other pair 3, 4. Each fluke element is of V-shaped cross section at any point throughout its length and is formed with a pointed entering end 5. The body part of each element is formed of a pair of flanges disposed at opposite outward inclinations with respect to each other. The flanges of element 1 are indicated 6, 7; element 2 at 8, 9; element 3 at 10, 11 and element 4 at 12, 13. Each of the flanges is reduced at its inner end as at 14. The reduced end 14 of the flanges 7, 8, 11 and 13 is provided with an opening 15. Each element includes a straight shank portion 16 and a curved gripping portion 17 disposed substantially at right angles to the outer end of the shank portion 16. The flanges 7, 8 of elements 1, 2 respectively are loosely coupled together by an oval-shaped link 18 passing through the opening 15 of such flanges. The flanges 11, 13 of the elements 3, 4 respectively are loosely coupled together by an oval-shaped link 19 passing through the opening 15 of such flange. The foregoing arrangement couples the fluke elements in pairs. The length of the links is such as to project a substantial distance from the inner end of the fluke elements.

The pairs of fluke elements are connected together by a coupling device comprising a clevis 20 and a bolt 21 extending through and secured to the arms of the latter and also passing through the links 18, 19. The links are positioned between the arm of the clevis and to the latter is connected a cable or rope 22.

Associated with the fluke elements for the purpose of maintaining the shanks 16 in nested relation relative to each other and for detachably holding the gripping portion of the fluke elements in extended position for anchoring, is a combined holding and weighting element 23 comprising a sleeve 24 of annular cross section. The inner face of sleeve 24 is square. The sleeve 24 has its outer diameter gradually increasing from each end to its transverse center. The element 23 is to be arranged in encompassing position with respect to the shank portions 16 and is slid thereon prior to the connecting of the clevis 20 to the links 18, 19.

When the element 23 is removed from off the shank portions 16, each pair of fluke elements is folded to the position shown in Figure 7. When the element 23 is arranged to encompass the shank portion 16, the parts of the flanges forming the shank portions abut and the arrangement is that flange 6 abuts flange 10; flange 7 the flange 8; flange 9 the flange 12 and flange 11 the flange 13.

What I claim is:—

1. An anchor comprising, fluke elements of V-shaped cross section, each including a shank portion and a gripping portion, and a tubular removable combined holding and weighting element encompassing and contacting with the front edges of the shank portions for maintaining the inner faces of the latter in abutting engagement throughout and for maintaining said gripping portions at right angles to each other, said element seated at its inner end at the point of mergence of the gripping portions with the shank portions.

2. An anchor comprising, fluke elements of V-shaped cross section, each including a shank portion and a gripping portion, a removable combined holding and weighting element for encompassing said shank portions for nesting the latter relative to each other and for maintaining said gripping portions at right angles to each other, links for connecting said fluke elements in pairs, and detachable means for coupling said links together and for connecting them to a cable.

3. In an anchor, fluke elements having portions of their length straight for nesting with inner faces in abutting engagement throughout, one relatively to a pair of others and the remaining portions thereof curved and angularly disposed with respect to said other portions and constituting grippers for extension at right angles to each other, said straight portions being of the same width as said curved portions, and a removable combined holding and weighting element for encompassing and nesting the first mentioned portions and for maintaining the grippers extended at right angles to each other.

4. In an anchor, fluke elements having portions of their length straight for nesting with their inner faces in abutting engagement throughout, one relatively to a pair of others and the remaining portions thereof curved and angularly disposed with respect to said other portions and constituting grippers for extension at right angles to each other, a removable combined holding and weighting element for encompassing and nesting the first mentioned portions and for maintaining the grippers extended at right angles to each other, each of said fluke elements formed of a pair of oppositely inclined flanges, and means for loosely coupling said fluke elements in pairs, said means extending through one of the flanges of each of the fluke elements.

5. In an anchor, fluke elements having portions of their length for nesting one relatively to a pair of others and the remaining portions thereof angularly disposed with respect to said other portions and constituting grippers for extension at right angles to each other, a removable combined holding and weighting element for encompassing and nesting the first mentioned portions and for maintaining the grippers extended at right angles to each other, each of said fluke elements formed of a pair of oppositely inclined flanges, means for loosely coupling said fluke elements in pairs, said means extending through one of the flanges of each of the fluke elements, and a detachable coupling device for connecting said means with a cable.

6. In an anchor, fluke elements having portions of their length for nesting one relatively to a pair of others and the remaining portions thereof angularly disposed with respect to said other portions and constituting grippers for extension at right angles to each other, and a removable combined holding and weighting element for encompassing and nesting the first mentioned portions and for maintaining the grippers extended at right angles to each other, said combined holding and coupling element having a squared passage for the reception of the first mentioned portions of said fluke elements.

7. In an anchor, fluke elements having portions of their length for nesting one relatively to a pair of others and the remaining portions thereof angularly disposed with respect to said other portions and constituting grippers for extension at right angles to each other, a removable combined holding and weighting element for encompassing and nesting the first mentioned portions and for maintaining the grippers extended at right angles to each other, said combined holding and coupling element having a squared passage for the reception of the first mentioned portions of said fluke elements, and said combined holding and coupling element having its body part gradually increasing in thickness from each end to its transverse median.

8. In an anchor, fluke elements having portions of their length straight for nesting with their inner faces in abutting engagement throughout, one relatively to a pair of others and the remaining portions thereof curved and angularly disposed with respect to said other portions and constituting grippers for extension at right angles to each other, said straight portions being of the same width as said curved portions, a removable combined holding and weighting element for encompassing and nesting the first mentioned portions and for maintaining the grippers extended at right angles to each other, and said combined holding and coupling element having its body part gradually increasing in thickness from each end to its transverse median.

9. In an anchor, a series of fluke elements, each including a shank and a gripper, and a removable holding and weighting sleeve of uniform inner diameter encompassing the outer faces of and abutting said shanks for maintaining the inner faces of the latter in abutting engagement throughout, said sleeve having its body part gradually increasing in thickness from each end to its transverse median, each gripper being curved and angularly disposed with respect to the outer end of a shank.

10. In an anchor, a series of fluke elements, each including a shank and a gripper, a removable holding and weighting sleeve for encompassing said shanks to maintain them in abutting relation, said sleeve having its body part gradually increasing in thickness from each end to its transverse median, each gripper being curved and angularly disposed with respect to the outer end of a shank, and a pair of links adapted to be connected with a cable, each of said links connecting the shanks of a pair of fluke elements together.

11. In an anchor, a set of fluke elements, each including a shank and a gripper extending outwardly at right angles from the inner end of the shank, a pair of links, each link being attached to and extended from the outer end of a pair of shanks, a removable combined holding down and weighting element encompassing the shanks for maintaining them in abutting relation throughout, said element seating at its inner end at the point of mergence of the grippers with the shank, and said links providing for coupling a cable to the anchor.

12. In an anchor, a series of fluke elements, each including a shank and a gripper, each shank having its outer end formed with an opening, said openings providing for the coupling of a cable to the flukes, and a sleeve encompassing said shanks and having its inner face bearing against the latter for maintaining the inner faces of the shanks in abutting engagement and the grippers at right angles to each other.

13. In an anchor, a series of fluke elements, each including a shank and a gripper, each shank having its outer end formed with an opening, said openings providing for the coupling of a cable to the flukes, and a sleeve encompassing said shanks and having its inner face bearing against the latter for maintaining the inner faces of the shanks in abutting engagement and the grippers at right angles to each other, said shanks being straight, of the same width as and of greater length than said grippers.

14. In an anchor, a set of fluke elements, each having its body formed throughout of a pair of flanges disposed at right angles to each other, each element including a shank and a curved gripper disposed at right angles to one end of the shank, the flanges of one shank abutting throughout a flange of a pair of adjacent shanks, a tubular holding down and weighting means for maintaining the flanges of said shanks in abutting engagement, seating at the inner end thereof at the point of mergence of the grippers with the shanks and for maintaining the grippers at right angles to each other.

15. In an anchor, a set of fluke elements, each having its body formed throughout of a pair of flanges disposed at right angles to each other, each element including a shank and a curved gripper disposed at right angles to one end of the shank, the flanges of one shank abutting throughout a flange of a pair of adjacent shanks, a tubular holding down and weighting means for maintaining the flanges of said shanks in abutting engagement, seating at the inner end thereof at the point of mergence of the grippers with the shanks and for maintaining the grippers at right angles to each other, and said shanks having openings at their other ends for coupling a cable therewith.

In testimony whereof, I affix my signature hereto.

WILSON L. McPHEETERS.